(12) United States Patent
Hartnett et al.

(10) Patent No.: US 9,982,768 B2
(45) Date of Patent: May 29, 2018

(54) SELF LUBRICATING CAM FOLLOWER ASSEMBLY

(71) Applicant: Roller Bearing Company of America, Inc., Oxford, CT (US)

(72) Inventors: Michael J. Hartnett, Middlebury, CT (US); Robert Lugosi, Oxford, CT (US)

(73) Assignee: Roller Bearing Company of America, Inc., Oxford, CT (US)

(*) Notice: Subject to any disclaimer, the term of this patent is extended or adjusted under 35 U.S.C. 154(b) by 136 days.

(21) Appl. No.: 14/865,998

(22) Filed: Sep. 25, 2015

(65) Prior Publication Data

US 2016/0091072 A1    Mar. 31, 2016

Related U.S. Application Data

(60) Provisional application No. 62/055,272, filed on Sep. 25, 2014.

(51) Int. Cl.
*F16H 53/06* (2006.01)
*F16N 11/04* (2006.01)

(52) U.S. Cl.
CPC ............. *F16H 53/06* (2013.01); *F16N 11/04* (2013.01)

(58) Field of Classification Search
CPC .. F16H 53/06; F16C 33/6655; F16C 33/6648; F16C 33/6674
See application file for complete search history.

(56) References Cited

U.S. PATENT DOCUMENTS

| 2,099,660 | A | | 11/1937 | Robinson |
| 2,265,554 | A | | 12/1941 | Thomas |
| 2,770,508 | A | * | 11/1956 | Smith ................... F16C 13/006 384/477 |
| 3,339,670 | A | | 9/1967 | McGrew, Jr. et al. |
| 3,596,533 | A | | 8/1971 | Nightingale |

(Continued)

FOREIGN PATENT DOCUMENTS

| GB | 2104163 B | 3/1985 |
| JP | 4812571 B2 | 11/2011 |
| WO | 2000040840 A1 | 7/2000 |

OTHER PUBLICATIONS

Extended European Search Report for EP Patent Application No. 15186895.7-1603, dated Feb. 19, 2016.

*Primary Examiner* — Thomas C Diaz
(74) *Attorney, Agent, or Firm* — Murtha Cullina LLP

(57) ABSTRACT

A cam follower assembly includes a shaft having a body defining a flanged head having an outer bearing surface extending therefrom. An outer ring is positioned around the shaft thereby forming an annular space there between. A plurality of rollers is positioned in the annular space. A channel extends through the shaft and branches radially outward at an outlet to communicate with the annular space. A lubrication assembly is positioned in the shaft and includes a pressurizing device located upstream of a lubrication reservoir and a metering device positioned downstream of the lubrication reservoir. The lubrication reservoir is in fluid communication with the outlet. The lubrication assembly includes a membrane positioned downstream of the lubrication reservoir. A piercing device is positioned proximate the membrane to pierce the membrane and release a lubricant from the lubrication reservoir.

16 Claims, 9 Drawing Sheets

(56) References Cited

U.S. PATENT DOCUMENTS

| | | | |
|---|---|---|---|
| 3,804,476 A * | 4/1974 | Nakamura | F16C 33/6648 |
| | | | 384/469 |
| 4,106,826 A | 8/1978 | Marola et al. | |
| 4,113,327 A | 9/1978 | Koch | |
| 4,231,267 A | 11/1980 | Van Slooten | |
| 4,571,097 A * | 2/1986 | Lee | F16C 19/36 |
| | | | 384/469 |
| 4,708,102 A | 11/1987 | Schmid | |
| 4,966,108 A | 10/1990 | Bentz et al. | |
| 5,178,107 A | 1/1993 | Morel, Jr. et al. | |
| 5,566,652 A | 10/1996 | Deppe | |
| 6,988,474 B2 | 1/2006 | Itoafa | |
| 7,097,361 B2 | 8/2006 | Rogers | |
| 7,293,919 B2 * | 11/2007 | Ueno | F04B 23/025 |
| | | | 384/462 |
| 7,387,096 B2 | 6/2008 | Tashiro | |
| 7,497,145 B2 | 3/2009 | El Hachem et al. | |
| 7,823,697 B2 | 11/2010 | Nishiwaki et al. | |
| 8,464,678 B1 | 6/2013 | Iskenderian | |
| 2005/0199446 A1 | 9/2005 | Nishiwaki et al. | |
| 2009/0175567 A1 | 7/2009 | Prescavage et al. | |
| 2011/0192277 A1 | 8/2011 | Fujiwara | |
| 2012/0111141 A1 | 5/2012 | Shibutani et al. | |
| 2014/0090251 A1 | 4/2014 | Brune et al. | |
| 2014/0245981 A1 | 9/2014 | Schnell et al. | |
| 2015/0013420 A1 | 1/2015 | Shibutani et al. | |

* cited by examiner

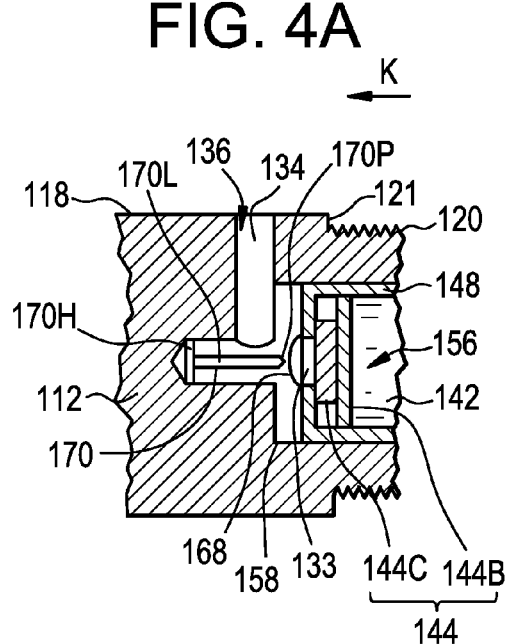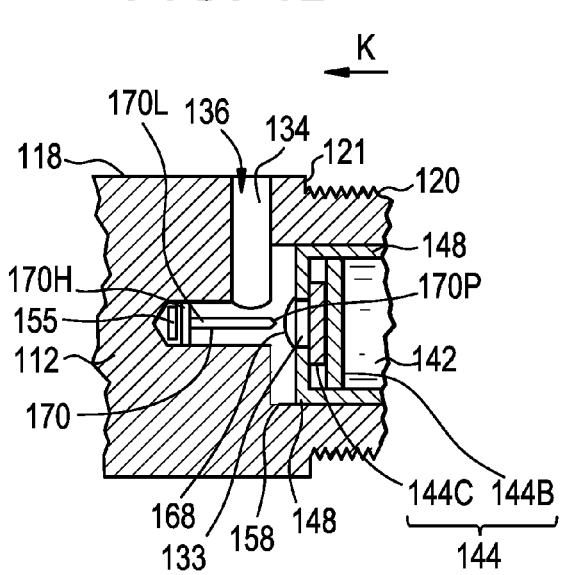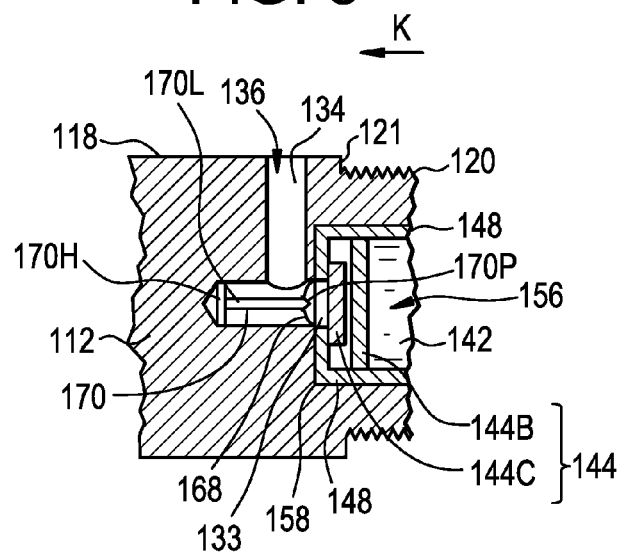

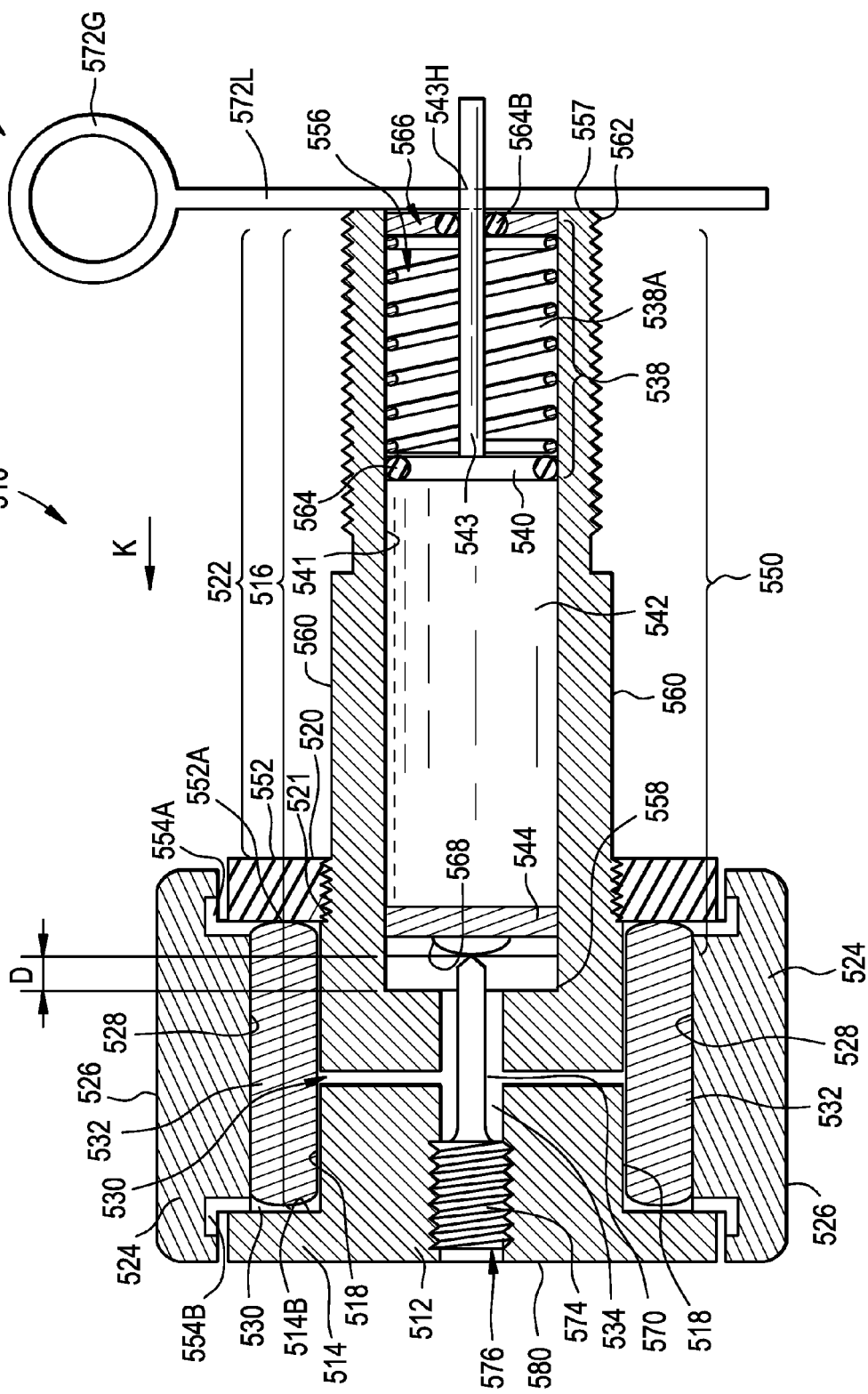

SELF LUBRICATING CAM FOLLOWER ASSEMBLY

CROSS REFERENCE TO RELATED APPLICATIONS

This application claims priority to U.S. Provisional Patent Application No. 62/055,272, filed Sep. 25, 2014, the subject matter of which is incorporated herein by reference in its entirety.

FIELD OF THE INVENTION

The present invention relates generally to a self lubricating cam follower assembly, and more specifically to a self lubricating cam follower assembly including a lubrication assembly removably positioned in a bore defined by a shaft of the cam follower assembly.

BACKGROUND OF THE INVENTION

A cam is a mechanical device which translates rotational motion into linear motion. A cam follower is a mechanical device which rollingly abuts the cam. The cam and the cam follower move relative to one another. The components of a cam follower generally include an outer ring rotatingly positioned around an end of a shaft, the shaft defining an inner race. Between the outer ring and the inner race is an annular space in which a plurality of rollers is positioned. Friction exists between the components of the cam follower, such as between the rollers and the outer ring and between the rollers and the inner race. Unfavorably high levels of friction between the components of a cam follower are a common problem in industry. Results of unfavorably high levels of friction include deformation of the components of the cam follower, an increase in temperature of the components of the cam follower and impedance of the cam follower's ability to carry out its function.

One solution to the problems associated with high levels of friction between the components of a cam follower is to apply lubrication, such as oil or grease, to the annular space between the outer ring and the shaft of the cam follower in which the rollers are positioned. Several devices exist for applying lubrication to the annular space. One such device is a grease gun, which may be used in conjunction with a Zerk fitting. However, grease guns used in conjunction with Zerk fittings do not provide lubrication automatically, require an external stimulus (e.g., pulling a trigger) and are not contained within the cam follower assembly.

Those skilled in the relevant art have long sought, but have been unable to arrive at, a device which would be contained within the cam follower and would automatically provide lubrication to a cam follower without requiring an external stimulus.

SUMMARY

In one aspect, the present invention resides in a self lubricating cam follower assembly. The cam follower assembly includes a shaft having a body portion. The body portion has a flanged head extending radially outward proximate one end of the shaft. The body portion has a cylindrical outer bearing surface extending from the flanged head and terminating part way along the body portion. The body portion defines a mounting portion between an end of the cylindrical outer bearing surface and a distal end of the shaft. The cam assembly includes an outer ring. The outer ring defines a cylindrical outer cam follower surface and a cylindrical inner surface defining a bore through the outer ring. The outer ring is positioned around the shaft so that the cylindrical inner surface and the cylindrical outer surface are aligned with one another and form an annular space there between. A plurality of rollers is positioned in the annular space. A channel extends through the shaft and branches radially outward to one or more outlets positioned at the cylindrical outer bearing surface. The cam follower assembly includes a lubrication assembly disposed in an interior area defined by the body portion. The lubrication assembly includes a pressurizing device positioned upstream of a lubrication reservoir and a metering device positioned downstream of the lubrication reservoir. The lubrication reservoir is in fluid communication with the outlet. A membrane (e.g., a thin sheet of a polymer material) is positioned downstream of and seals the lubrication reservoir. A piercing device positioned proximate the membrane. The membrane is piercable by the piercing device to release a lubricant from the lubrication reservoir.

When the cam follower assembly is assembled or upon manual activation of a piercing assembly, a piercing device pierces the piercable membrane, allowing the lubrication to flow from the lubrication reservoir. One advantage of the piercable membrane is that it allows the lubrication assembly to dispense lubrication upon assembly cam follower assembly or at a selectively predetermined time, for example after a specific number of hours of operation or upon reaching at threshold temperature level.

In one embodiment, the metering device is a porous material (e.g., a ceramic or a metal). Lubrication flows through the lubrication channel and through the porous material (and consequently into the annular space containing the rollers) at a rate based on porosity of the material, viscosity of the lubrication, and the pressure exerted on the lubricant.

In one embodiment, the metering device is a bi-metallic strip. The bi-metallic strip allows lubrication to flow into the lubrication channel at a rate based on temperature of the cam follower assembly. One advantage of the bi-metallic strip is that it allows the lubrication to flow within a predetermined range of temperatures outside of which the lubrication does not flow, allowing for the lubrication assembly to dispense lubrication when the cam follower assembly is assembled and exceeds the predetermined temperature.

In one embodiment, the cam follower assembly includes an activation device removably coupled to the pressurizing device. The activation device movably engages the shaft. The pressurizing device defines a standby position wherein the activation device secures the pressurizing device in fixed relation to the shaft. The pressurizing device defines an activated position wherein the activation device is separated from the pressurizing device and the pressurizing device is activated to move into the lubrication reservoir.

DESCRIPTION OF THE DRAWINGS

FIG. 4A is a partial side cross sectional view of another alternative embodiment of the cam follower assembly of FIG. 2 wherein the lubrication assembly includes a piercable membrane;

FIG. 4B is another embodiment of the cam follower assembly of FIG. 4A further including a bi-metallic strip for moving the piercing device;

FIG. 5 is a partial side cross sectional view of an alternative embodiment of the cam follower assembly of FIG. 4 wherein the piercable membrane has been pierced;

FIG. 8 is a side cross sectional view of an alternative embodiment of the cam follower assembly of FIG. 6A wherein the lubrication assembly is not contained in a cartridge.

DETAILED DESCRIPTION OF THE PREFERRED EMBODIMENT

Figure 1A:
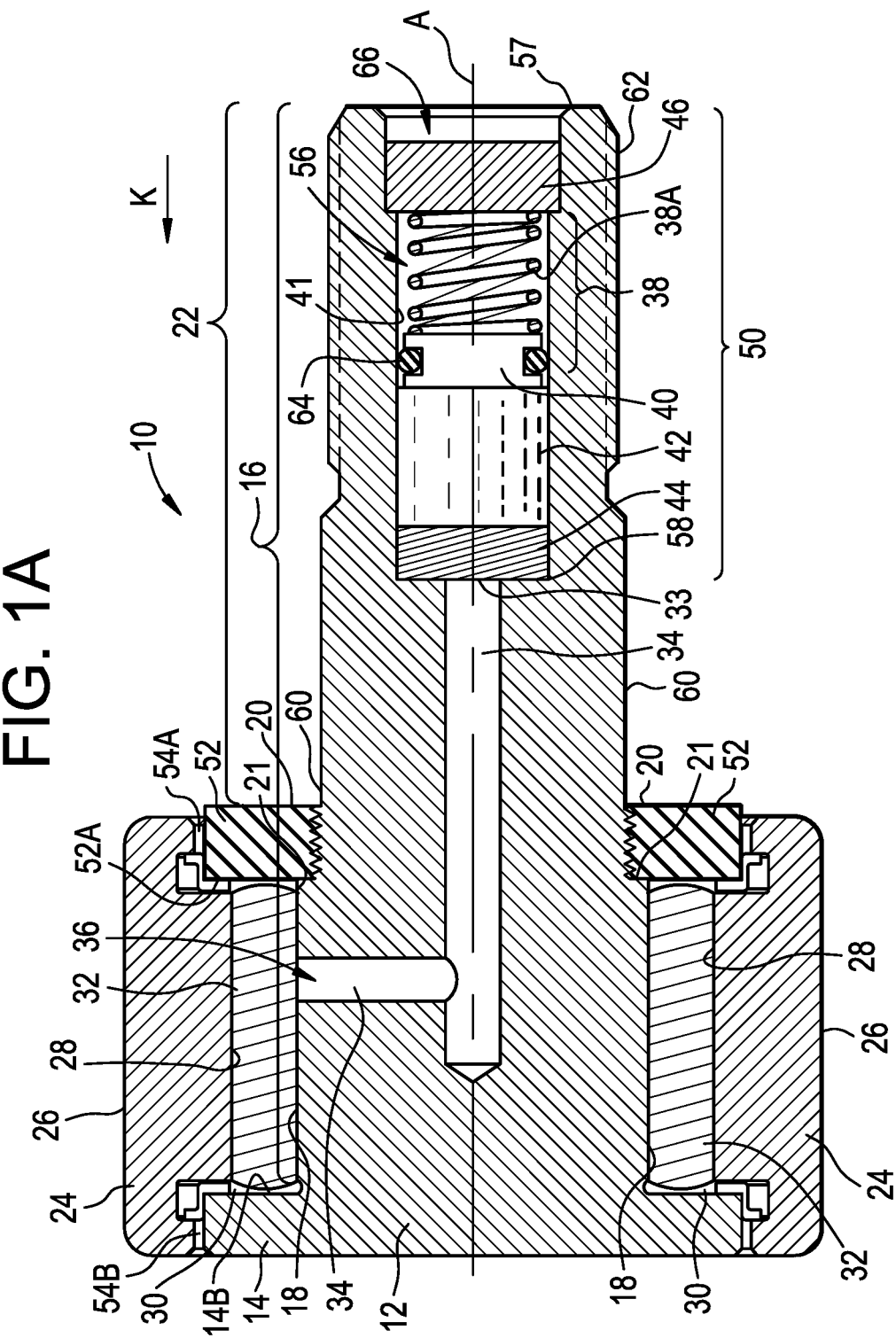
FIG. 1A is a side cross sectional view of a cam follower assembly having a lubrication assembly therein.

As shown in FIG. 1A, a cam follower assembly is generally designated by the numeral 10. The cam follower assembly 10 includes a shaft 12 with a flanged head 14. The flanged head 14 extends radially outward proximate one end of the shaft 12. The shaft 12 also has a body portion 16. A cylindrical outer bearing surface 18 extends from an interior surface 14B of the flanged head 14 and terminates part way along the body portion 16 at a shoulder 21.

As shown in FIG. 1A, the body portion 16 has a mounting portion 22 for removably securing the mounting portion to a base (not shown). The mounting portion 22 includes an interior area 56 defined by an interior surface 41. The interior area 56 defines a bore 66 terminating partway through the body portion 16. A portion of the interior area 56 defines a lubrication reservoir 42 having an outlet 33. A channel 34 extends from the outlet 33 through the mounting portion 22 as described herein. In one embodiment, the mounting portion 22 includes two external surfaces 60 and 62 longitudinally adjacent to one another and coaxial about a central longitudinal axis A. The two surfaces 60 and 62 have different outside diameters (e.g., the surface 60 has a smaller diameter that the surface 62 or the surface 62 has a smaller diameter than the surface 60). In one embodiment, illustrated in FIG. 1A, a second of the two surfaces 62 is a threaded surface for securing the mounting portion 22 to a base. However, the present invention is not limited in this regard, as any suitable means of attaching the mounting portion 22 to the base may be employed, including but not limited to a welded or brazed joint.

As illustrated in FIG. 1A, an outer ring 24 is assembled around the shaft 12. The outer ring 24 has an outer cylindrical cam follower surface 26 and a cylindrical inner surface 28. The outer ring 24 is positioned on the shaft 12 so that the cylindrical outer bearing surface 18 and the cylindrical inner surface 28 are aligned with one another. An annular space 30 is defined between the cylindrical outer bearing surface 18 and the cylindrical inner surface 28. A plurality of rollers 32 is positioned in the annular space 30. The plurality of rollers 32 rollingly engages the cylindrical outer bearing surface 18 and the cylindrical inner surface 28. In one embodiment, illustrated in FIG. 1A, the plurality of rollers 32 includes two rows of rollers 32. In this embodiment, each row of rollers 32 is longitudinally positioned in the annular space 30.

Figure 1B:
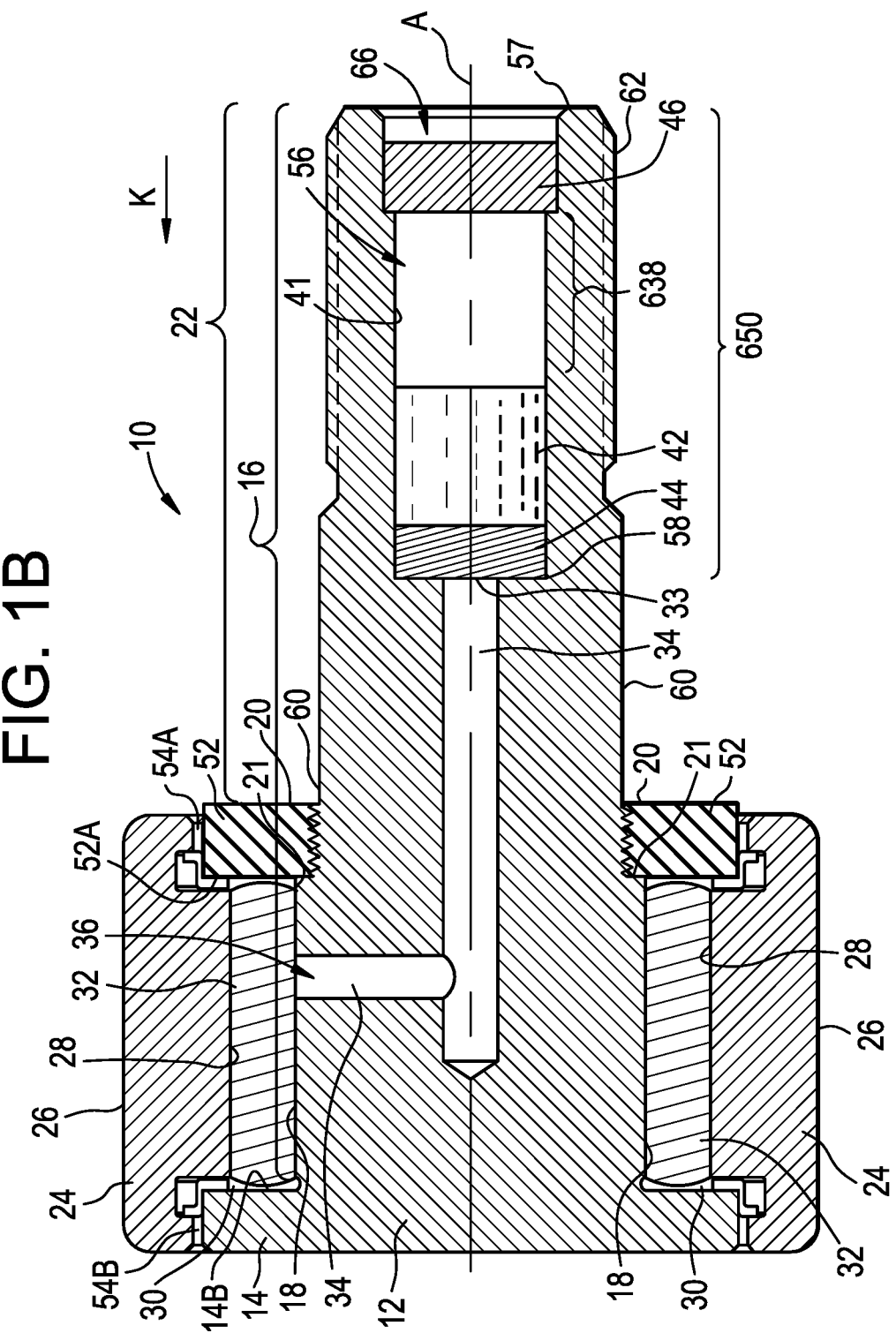
FIG. 1B is a side cross sectional view of an alternative embodiment of the cam follower assembly having a lubrication assembly therein.

As shown in FIG. 1A, the channel 34 extends axially through the mounting portion 22 into the body portion 16. The channel 34 branches radially outward to an outlet 36 at the cylindrical outer bearing surface 18. Although one outlet 36 is shown in FIG. 1A, the present invention is not limited in this regard, as any suitable number of outlets may be provided, including but not limited to two outlets, three outlets, four outlets or more outlets. As illustrated in FIG. 1A, a lubrication assembly 50 is contained and sealed within the interior area 56 inside the body portion 16 by an end cap 46. The end cap 46 is configured to removably position the lubrication assembly in the interior area 56. The lubrication assembly 50 includes a pressurizing device 38, a lubrication reservoir 42 and a metering device 44. The pressurizing device 38 includes a plunger 40 (e.g., a piston). The plunger 40 includes an O-ring 64. The O-ring 64 extends circumferentially around the plunger 40 and slidingly and sealingly engages an interior surface 41 of the lubrication reservoir 42 and retains the pressurizing device in the bore 66. The pressurizing device 38 and the lubrication reservoir 42 are contained and sealed within the interior area 56 inside the body portion 16 so that the pressurizing device 38 is configured to pressurize the lubrication reservoir 42 from within the inside area 56. The end cap 46 engages the pressurizing device 38. In one embodiment, as shown in FIG. 1A, the pressurizing device 38 includes a spring 38A compressed between and engaging the plunger 40 and the end cap 46. However, the present invention is not limited in this regard, as any suitable pressurizing device 38 may be used, including but not limited to a pressurized air cartridge. For example, and as shown in FIG. 1B, the cam follower assembly 10 includes a shaft 12, an outer ring 24 with a bore 66 through said outer ring 24, the outer ring 24 being positioned around the shaft 12 so that the cylindrical inner surface 28 and the cylindrical outer bearing surface 18 are aligned with one another and form an annular space 30 there between. The cam follower assembly of FIG. 1B includes a plurality of rollers 32 positioned in the annular space 30 and a lubrication assembly 650 disposed in an interior area 56 defined by a body portion 16 of the shaft 12. The lubrication assembly 650 including a pressurizing device 638 that is in communication with a lubrication reservoir 42.

As used herein, upstream to downstream refers to an alignment in the direction of the arrow K, for example from one end 57 of the shaft 12 to the end 58 of the lubrication assembly 50. The pressurizing device 38 is positioned upstream of the lubrication reservoir 42. The metering device 44 is positioned downstream of the lubrication reservoir 42 upstream of the outlet 33. The lubrication reservoir 42 is in fluid communication with the outlet 36 via the outlet 33 and the channel 34.

As shown in FIG. 1A, an annular ring 52 (e.g., a nut) has a threaded interior surface (e.g., a female thread) complementary to the threaded surface 20. The nut 52 is sized to fit over (e.g., slide over) the surfaces 60 and 62 and be threaded onto the shaft 12 so that when tightened, an axially facing surface 52A of the nut 52 abuts the shoulder 21. The annular ring 52 is removably positioned (e.g., threaded to the shaft) so that the rollers 32 are spaced apart from the flanged head 14 and the annular ring 52. This allows the rollers 32 to move freely in the annular space 30. A seal 54A is positioned between the annular ring 52 and the outer ring 24. A similar seal 54B is positioned on an opposite side of the rollers 32 between the interior surface of the flanged head 14B of the shaft 12 and the outer ring 24. The seals 54A and 54B function to prevent debris from entering the annular space 30. In one embodiment, the seal is manufactured from a flexible material such as, but not limited to, plastic, rubber or latex.

In one embodiment as illustrated in FIG. 1A, the end cap 46 is removably positioned in the interior area 56. In this embodiment, removal of the end cap 46 allows access to the lubrication assembly 50. However, the present invention is not limited in this regard, as the end cap 46 may be fixedly positioned in the interior area 56.

In one embodiment, as illustrated in FIG. 1A, the metering device 44 is a porous material (e.g., a ceramic or a metal). However, the present invention is not limited in this regard, as any suitable metering device may be used, including but not limited to an orifice plate and a bi-metallic strip, as discussed herein with respect to FIG. 2. The porous material 44A controls the flow of a lubricant from the lubrication reservoir 42 into the channel 34. The porous material 44 is of a predetermined porosity. Viscosity of the lubricant and size of pores in the porous material affect flow rate of the lubricant.

In one embodiment shown in FIG. 1A, during operation, the metering device 44 allows flow of the lubricant from the lubrication reservoir 42 in response to a change in temperature. The porous material 44A allows the lubricant to flow from the lubrication reservoir 42 when the lubricant has a certain viscosity, which is a function of the temperature of the shaft 12. In this embodiment, upon an increase in temperature of the shaft, the lubricant becomes less viscous and is allowed to flow through the porous material 44A.

Figure 2:
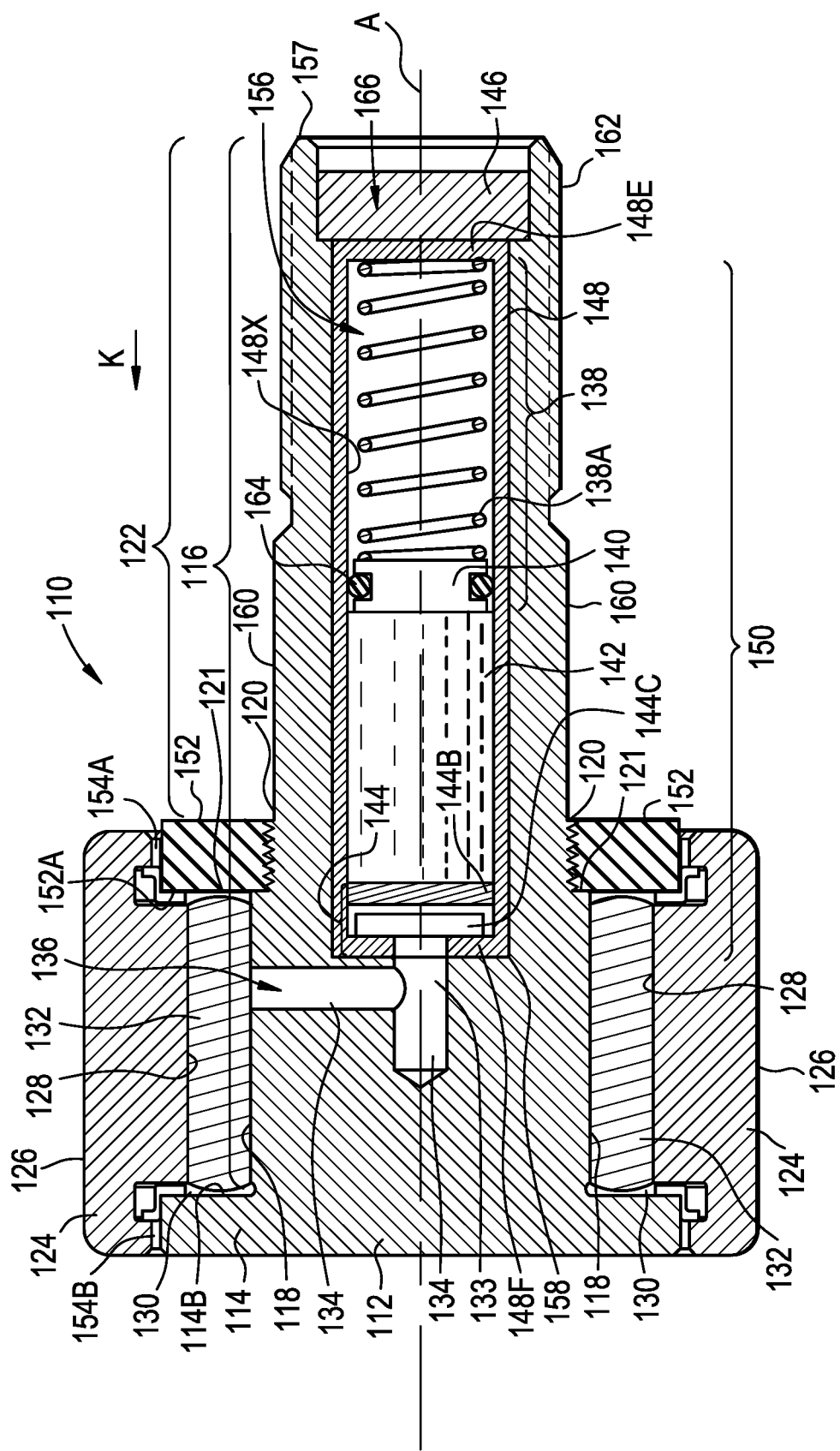
FIG. 2 is a side cross sectional view of an alternative embodiment of the cam follower assembly of FIG. 1A wherein the lubrication assembly including a metering device is contained in a cartridge.

The cam follower assembly of FIG. 2 is similar to that of FIG. 1A, thus similar elements are assigned similar element numbers, preceded by the numeral 1. In one embodiment, as shown in FIG. 2, a lubrication assembly 150 is contained in a cartridge 148. The cartridge 148 is removably positioned in interior region 156. However, the present invention is not limited in this regard, as the cartridge 148 may be fixedly positioned in the interior region 156. The lubrication assembly 150 includes a pressurizing device 138, a lubrication reservoir 142 and a metering device 144. The pressurizing device 138 includes a spring 138A that is compressed between and engaging a plunger 140 and an axial end 148E of the cartridge 148. The axial end 148E is secured to the cartridge by a suitable method (e.g., welding) after the plunger 140, seal 164 and spring 138A are disposed in the cartridge 148. The plunger 140 has seal 164 (e.g. an O-ring) positioned circumferentially therearound. The seal 164 slidingly engages an interior surface 148X of the cartridge 148. The lubrication reservoir 142 is positioned between the plunger 140 and an opposing end 148F of the cartridge 148.

In one embodiment, as illustrated in FIG. 2, the metering device 144 includes a bi-metallic strip 144C and an orifice plate 144B, both contained in the cartridge 148. The bi-metallic strip 144C is positioned upstream of the orifice plate 144B. Although in FIG. 2 the bi-metallic strip 144C is positioned upstream of the orifice plate 144B, the present invention is not limited in this regard, as any suitable positioning of the orifice plate 144B in relation to the bi-metallic strip 144C may be used. The bi-metallic strip 144C expands upon an increase in temperature.

In one embodiment, the bi-metallic strip 144C controls the flow of the lubricant from the lubrication reservoir 142. During operation of the cam follower assembly 110 of FIG. 2, the bi-metallic plate 144C allows the lubricant to flow from the lubrication reservoir 142 when an increase in temperature of the shaft 112 causes the bi-metallic strip 144C to expand and the lubricant within the lubrication reservoir 142 to become less viscous.

Figure 3:
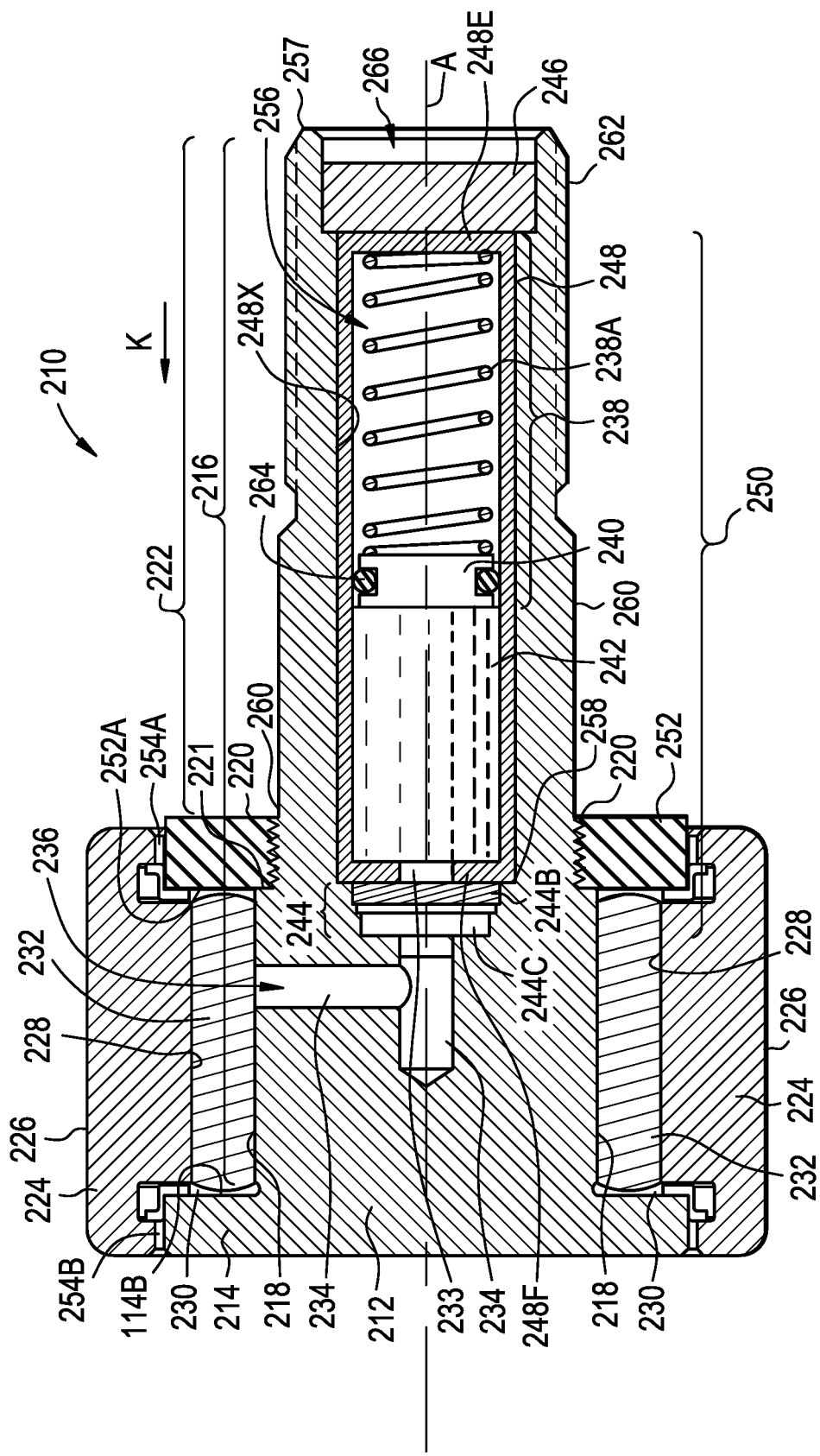
FIG. 3 is a side cross sectional view of another alternative embodiment of the cam follower assembly of FIG. 2 wherein the metering device is positioned outside of the cartridge.

The cam follower assembly of FIG. 3 is similar to that of FIG. 1A, thus similar elements are assigned similar element numbers, preceded by the numeral 2. As illustrated in FIG. 3, the metering device 244 is fixedly positioned outside of the cartridge 248. In the embodiment shown in FIG. 3, lubricant flows through another outlet 233 proximate the end 248F of the cartridge 248 prior to flowing through the metering device 244.

In one embodiment, as illustrated in FIG. 4A, a piercable membrane (e.g., a thin sheet of a polymer material) 168 is positioned downstream of the lubrication reservoir 142 and a piercing device 170 is positioned proximate the membrane 168. The piercing device 170 is defined by a shaft portion 170L that extends between a head portion 170H and a sharp pointed end 170P. In this embodiment, the piercable membrane 168 is piercable by the piercing device 170, and when pierced releases the lubricant from the lubrication reservoir 142, as shown in FIG. 5. In one embodiment, the piercing device 170 engages and pierces the membrane 168 upon assembly of the cam follower assembly 110 by inserting the cartridge 148 into the interior region 156 so that the cartridge 148 abuts the end 158 of the interior area 156. In this embodiment, the lubricant remains inside of the lubrication reservoir 142 until assembly of cam follower assembly 110.

As shown in FIG. 4B, in one embodiment, a bi-metallic strip 155 abuts the head portion 170H of the piercing device 170 and when heated to a predetermined temperature causes the piercing device 170 to move towards and pierce the membrane 168.

Figure 6A:
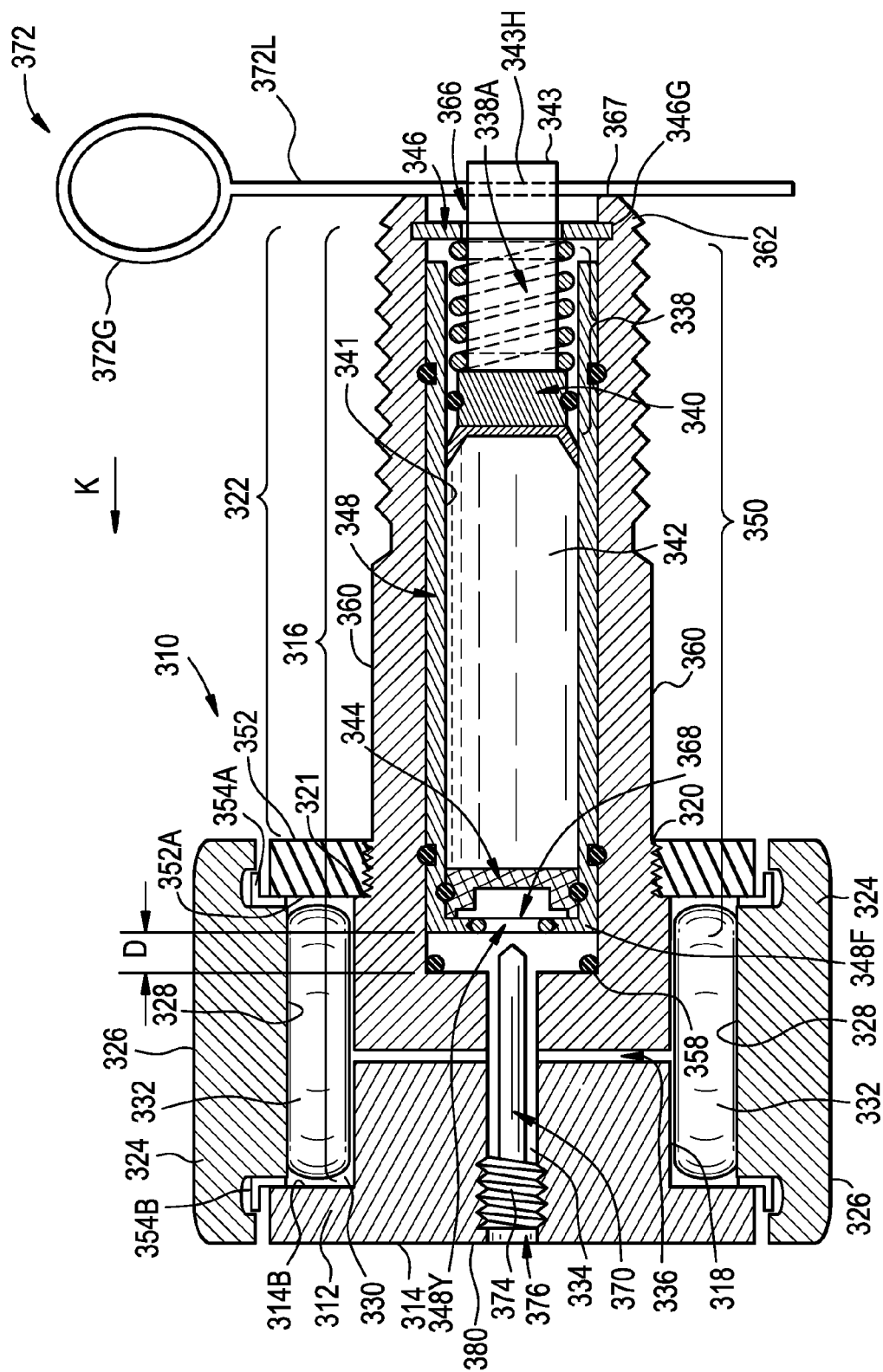
FIG. 6A is a side cross sectional view of an alternative embodiment of the cam follower assembly of FIG. 4 wherein an activation device controls movement of the lubrication assembly including the piercable membrane in regards to a piercing device.

The cam follower assembly of FIG. 6A is similar to that of FIG. 1A, thus similar elements are assigned similar element numbers, preceded by the numeral 3. The cam follower assembly 310 includes a lubrication assembly 350. The lubrication assembly 350 includes a pressurizing device 338, a lubrication reservoir 342 and a metering device 344 disposed in a cartridge 348. The pressurizing device 338 includes a spring 338A that is compressed between and engaging a plunger 340 and a retaining ring 346, as described further herein.

As shown in FIG. 6A, the cartridge 348 has an opening 348Y extending through a downstream end 348F of the cartridge 348. A piercable membrane 368 extends across and seals the opening 348Y. A piercing device 370 is positioned in a bore 376 that extends into an end 380 of the shaft 312. The piercing device 370 includes a self-locking insert 374 (e.g., an allen head screw with self-locking threads) formed on one end thereof. The self-locking insert 374 is movably positioned inside of the bore 376. In one embodiment, the self-locking insert 374 has a threaded surface (e.g., male thread) and the bore 376 has a threaded surface complementary to an interior surface 382 of the bore 376 (e.g., female thread). The piercing device 370 moves relative to the piercable membrane 368 via the complementary threaded surfaces until the piercing device 370 is positioned such that a distal end thereof extends beyond the end 358.

Figure 6B:
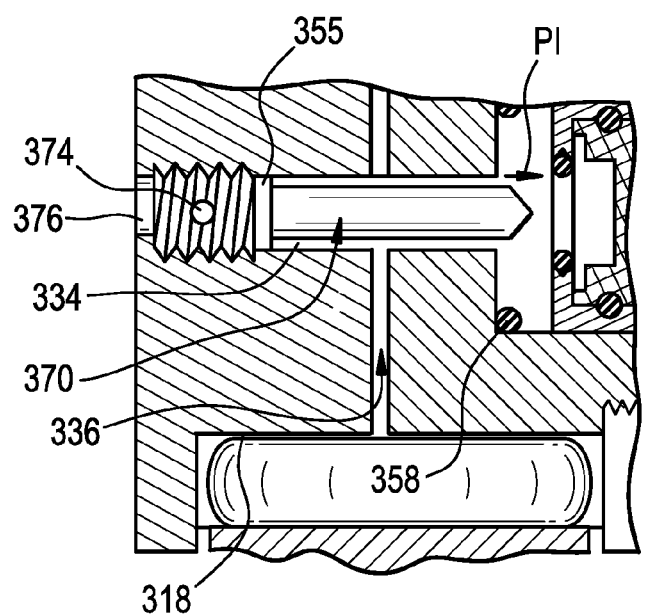
FIG. 6B is another embodiment of the cam follower assembly of FIG. 6A further including a bi-metallic strip for moving the piercing device.

As shown in FIG. 6B, in one embodiment, the piercing device 370 includes a bi-metallic strip 355 positioned between the self-locking insert 374 and the piercing device 370. The piercing device 370 moves in response to temperature increase of the bi-metallic strip 355, causing the piercing device 370 to move in the direction indicated by the arrow P1 towards the piercable membrane 368. Thus, when the temperature of the bi-metallic strip 355 increases to a predetermined magnitude, the piercing device 370 pierces the piercable membrane 368 thereby releasing the lubricant from the lubrication reservoir 342.

In one embodiment, illustrated in FIG. 6A, the cam follower assembly 310 of the present invention includes an activation device 372 removably coupled to the pressurizing device 338. The pressurizing device 338 includes a spring 338A that is compressed between the plunger 340 and the retaining ring 346 (e.g., a split ring) seated in a groove 346G located in the bore 366. A shaft 343 is secured to and extends from the plunger 340 and through the spring 338A and an opening in the retaining ring 346. The shaft 343 extends out of the bore 366. A portion of the shaft 343 that extends out of the bore 366 has a hole 343H radially extending therethrough. The activation device 372 defines a shaft section 372L extending from a gripping portion 372G is removably disposed in the hole 343H so that portions of the shaft section 372L movably engage an axial end 367 of the shaft 312. The pressurizing device 338 defines a standby position in which the activation device 372 secures the pressurizing device 338 in fixed relation to the shaft 312 thereby maintaining the spring 338A compressed between the plunger 340 and the retaining ring 346. The pressurizing device 338 defines an activated position in which the activation device 372 is separated from the pressurizing device 338 (e.g., the shaft portion 372L is removed from the hole 343H) and the pressurizing device 338 is activated to move into the lubrication reservoir 342. Upon removal of shaft portion 372L of the activation device 372 from the hole 343H, the pressurizing device 338 activates (e.g., the spring 338A expands), causing a force to be exerted on the plunger 340. The force exerted on the plunger 340 is transmitted through the incompressible lubricant, contained in the lubrication reservoir 342, to the membrane 368, causing the entire lubrication assembly to move a distance D relative to the piercing device in the direction K until an edge of the lubrication assembly 350 proximate the edge 358 is in abutment with the edge 358, causing the piercing device 370 to pierce the piercable membrane.

The lubrication assembly 350 is positioned the distance D from the end 358 of the bore 366. As shown in FIG. 6A, the lubrication assembly 350 is contained in the cartridge 348. In an alternative embodiment, as shown in FIG. 8 elements similar to those of FIG. 1A are preceded by the numeral 5. As shown in FIG. 8, the plunger 540 engages a shaft 543, which engages the activation device 572. The end cap 566 includes an O-ring 564B between the inner surface defined by the bore through which the shaft 543 extends and the outer surface defined by the shaft 543 to seal the lubrication assembly 550.

Figure 7:
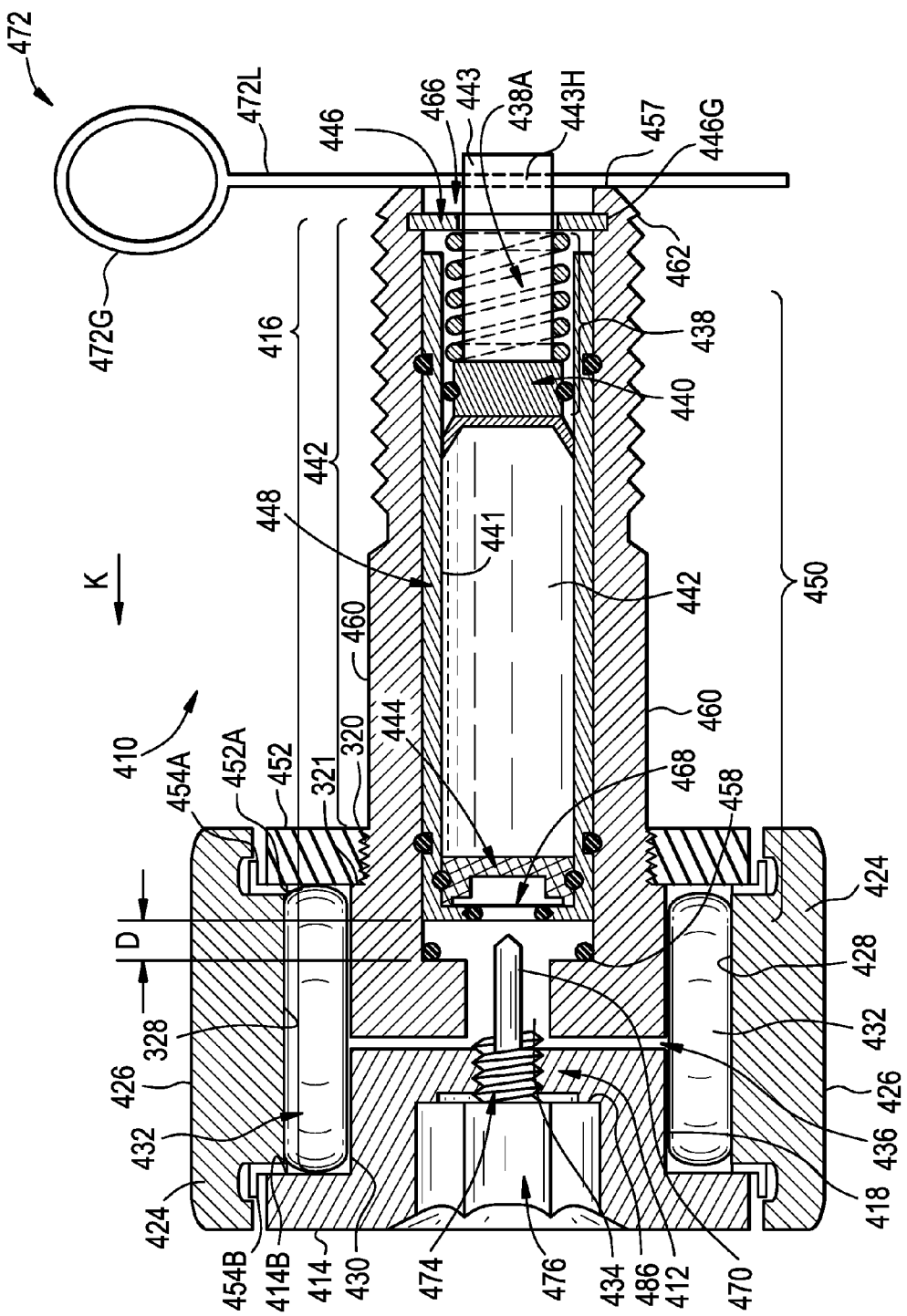
FIG. 7 is a side cross sectional view of an alternative embodiment of the cam follower assembly of FIG. 6A wherein the cam follower assembly includes a hex hole.

In one embodiment, illustrated in FIG. 7, elements similar to those of FIG. 1A are preceded by the numeral 4. As shown in FIG. 7, the flanged head 414 has a bore 476 defining a hex hole with six equally sized walls. A smaller, threaded bore 484 extends from a distal end 486 of the bore 476. The self locking insert 474 is positioned in the threaded bore 484. A hex tool (not shown), such as an Allen key, engages the walls of the bore 476 to progressively rotate the flanged head 414 into the base (not shown).

Although the present invention has been disclosed and described with reference to certain embodiments thereof, it should be noted that other variations and modifications may be made, and it is intended that the following claims cover the variations and modifications within the true scope of the invention.

What is claimed is:

1. A cam follower assembly, comprising:
   a shaft having a body portion, the body portion having a flanged head extending radially outward proximate one end of the shaft, the body portion having a cylindrical outer bearing surface extending from the flanged head and terminating part way along the body portion, the body portion defining a mounting portion between an end of the cylindrical outer bearing surface and a distal end of the shaft;
   an outer ring defining a cylindrical outer cam follower surface and a cylindrical inner surface defining a bore through said outer ring, the outer ring being positioned around the shaft so that the cylindrical inner surface and the cylindrical outer bearing surface are aligned with one another and form an annular space there between;
   a plurality of rollers, positioned in said annular space;
   a channel extending through the shaft and branching radially outward at an outlet positioned at the cylindrical outer bearing surface; and
   a lubrication assembly contained and sealed within an interior area inside the body portion, the lubrication assembly including a pressurizing device in communication with a lubrication reservoir, the pressurizing device and the lubrication reservoir being contained and sealed within the interior area inside the body portion so that the pressurizing device is configured to pressurize the lubrication reservoir from within the inside area, the lubrication reservoir being in fluid communication with the outlet.

2. The cam follower assembly according to claim 1, further comprising a metering device positioned downstream of the lubrication reservoir.

3. The cam follower assembly of claim 2, wherein the metering device is a porous material.

4. The cam follower assembly of claim 3, wherein the porous material controls flow of a lubricant from the lubrication reservoir based on temperature of the cam follower assembly.

5. The cam follower assembly of claim 1, wherein pressurizing device is a spring.

6. The cam follower assembly of claim 1, wherein an end cap contains and seals the lubrication assembly within the interior area inside the body portion.

7. The cam follower assembly of claim 6, wherein the end cap is removably positioned in the interior area.

8. The cam follower assembly of claim 6, wherein one side of the end cap engaging the pressurizing device.

9. The cam follower assembly of claim 2, wherein the metering device comprises a bi-metallic strip and an orifice plate, wherein the bi-metallic strip moves upon temperature increase.

10. The cam follower assembly of claim 9, wherein the bi-metallic strip controls flow of a lubricant from the lubrication reservoir based on a temperature of the cam follower assembly.

11. The cam follower assembly of claim 2, wherein the metering device allows flow of a lubricant from the lubrication reservoir in response to a change in temperature of the cam follower assembly.

12. The cam follower assembly of claim 1, further comprising;

an activation device removably coupled to the pressurizing device;
the activation device movably engaging the shaft;
the pressurizing device defining a standby position wherein the activation device secures the pressurizing device in fixed relation to the shaft; and
the pressurizing device defining an activated position wherein the activation device is separated from the pressurizing device and the pressurizing device is activated to move into the lubrication reservoir.

13. The cam follower assembly of claim 1, wherein said plurality of rollers comprises two rows of rollers, each row being longitudinally positioned in said annular space.

14. The cam follower assembly according to claim 1, further comprising:
a membrane positioned downstream of the lubrication reservoir; and
a piercing device positioned proximate the membrane, the membrane being piercable by the piercing device to release a lubricant from the lubrication reservoir.

15. The cam follower assembly of claim 1, wherein the lubrication assembly is contained in a cartridge.

16. The cam follower assembly of claim 15, wherein the metering device is fixedly positioned outside of the cartridge such that the lubricant from the lubrication reservoir flows through the cartridge prior to flowing through the metering device.

* * * * *